United States Patent
Nagai et al.

(10) Patent No.: US 8,431,503 B2
(45) Date of Patent: Apr. 30, 2013

(54) ALKALI-FREE GLASS AND METHOD FOR PRODUCING SAME

(75) Inventors: Kensuke Nagai, Tokyo (JP); Yuichi Kuroki, Tokyo (JP); Manabu Nishizawa, Tokyo (JP); Tomoyuki Tsujimura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/342,592

(22) Filed: Jan. 3, 2012

(65) Prior Publication Data

US 2012/0149544 A1 Jun. 14, 2012

Related U.S. Application Data

(63) Continuation of application No. PCT/JP2010/060904, filed on Jun. 25, 2010.

(30) Foreign Application Priority Data

Jul. 2, 2009 (JP) .................................. 2009-157542
Jun. 3, 2010 (JP) .................................. 2010-127767

(51) Int. Cl.
  *C03C 3/087* (2006.01)
  *C03C 3/091* (2006.01)
  *C03B 19/01* (2006.01)
  *C03B 13/00* (2006.01)

(52) U.S. Cl.
  USPC .................. 501/70; 501/66; 501/69; 65/17.3; 65/99.2

(58) Field of Classification Search .................... 501/66, 501/69, 70; 65/17.3, 90, 99.1, 99.2, 99.3, 65/99.4, 99.5, 99.6

See application file for complete search history.

(56) References Cited

U.S. PATENT DOCUMENTS

| 5,326,730 | A | | 7/1994 | Dumbaugh, Jr. et al. |
| 5,776,844 | A | * | 7/1998 | Koch et al. ...................... 501/70 |
| 5,780,371 | A | * | 7/1998 | Rifqi et al. ...................... 501/67 |
| 2007/0191207 | A1 | * | 8/2007 | Danielson et al. .............. 501/66 |
| 2008/0053152 | A1 | * | 3/2008 | Kurachi et al. .............. 65/30.14 |
| 2011/0071012 | A1 | * | 3/2011 | Kondo et al. .................... 501/71 |

FOREIGN PATENT DOCUMENTS

| JP | 62-100450 | | 5/1987 |
| JP | 62-113735 | | 5/1987 |
| JP | 63-176332 | | 7/1988 |
| JP | 04-325435 | | 11/1992 |
| JP | 05-232458 | | 9/1993 |
| JP | 08-109037 | | 4/1996 |
| JP | 10-045422 | | 2/1998 |
| JP | 2006106195 | A * | 4/2006 |
| JP | 2008150228 | A * | 7/2008 |
| WO | WO 2008/132887 | | 11/2008 |
| WO | WO 2009/028512 | | 3/2009 |
| WO | WO 2009/054314 | | 4/2009 |

OTHER PUBLICATIONS

Machine Translation of JP 10-045422 A, Feb. 17, 1998.*
International Search Report issued Aug. 17, 2010 in PCT/JP2010/060904 filed Jun. 25, 2010.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention provides an alkali-free glass having a high strain point, a low viscosity and low devitrification, which is easily subjected to float molding and fusion molding. The glass herein has a strain point of 725° C. or higher, an average thermal expansion coefficient at 50 to 300° C. of $30 \times 10^{-7}$ to $40 \times 10^{-7}/°$ C., a temperature $T_2$ at which a glass viscosity becomes $10^2$ dPa·s of 1,710° C. or lower, a temperature $T_4$ at which a glass viscosity becomes $10^4$ dPa·s of 1,330° C. or lower, a glass surface devitrification temperature ($T_c$) of 1,330° C. or lower, and a glass internal devitrification temperature ($T_d$) of 1,330° C. or lower.

10 Claims, No Drawings

ALKALI-FREE GLASS AND METHOD FOR PRODUCING SAME

TECHNICAL FIELD

The present invention relates to an alkali-free glass that is suitable as a substrate glass for various kinds of displays or a substrate glass for photomasks, and that does not substantially contain alkali metal oxides and can be subjected to float molding and fusion molding (downdraw molding).

BACKGROUND ART

In forming substrate glasses for various kinds of displays, especially metals or oxide thin films on their surfaces, the following characteristics have been required.

(1) If an alkali metal oxide is contained, since alkali metal ions are diffused into a thin film and degrade the film characteristics, alkali metal ions should not be substantially contained.

(2) In case of being exposed to a high temperature in a thin film formation process, the strain point should be high to be able to suppress the contraction (thermal contraction) due to the deformation of the glass and the structural stabilization of the glass to a minimum.

(3) Sufficient chemical durability with respect to various kinds of chemicals that are used in semiconductor formation should be provided. In particular, the durability with respect to buffered hydrofluoric acid (BHF: a mixed solution of fluoric acid and ammonium fluoride) for the etching of $SiO_x$ or $SiN_x$, medicinal fluids containing hydrochloric acid and which are used in the etching of ITO, various kinds of acids (nitric acid, sulfuric acid, etc.) that are used in the etching of metal electrodes, and the alkali of a resist peeling-off liquid should exist.

(4) Defects (foam, striae, inclusions, pits, scratches, etc.) should not be present internally and on the surface.

In addition to the aforementioned requirements, the following states have recently been in demand.

(5) The lightness of displays is required and a glass itself is desired to have a low density.

(6) The lightness of displays is requested, and a substrate glass is desired to have a reduced thickness.

(7) In addition to amorphous silicon (a-Si) liquid crystal displays used up to now, polycrystalline silicon (p-Si) liquid crystal displays with a slightly high heat treatment temperature have been prepared (a-Si: about 350° C.→p-Si: 350-550° C.).

(8) In order to raise the productivity or heat impact resistance by raising the temperature rise and drop rate of a liquid-crystal-display preparation heat treatment, a glass with a small average thermal expansion coefficient has been in demand.

On the other hand, as the dryness of etching is advanced, the demand for BHF resistance has been weakened. In glasses used up to now, to improve the BHF resistance, glasses containing 6 to 10 mol % of $B_2O_3$ have frequently been used. However, $B_2O_3$ tends to lower the strain point. As examples of an alkali-free glass containing no $B_2O_3$ or with a low content, the following can be mentioned.

In Patent Document 1, a $SiO_2$—$Al_2O_3$—SrO glass containing no $B_2O_3$ is described; however, since 77 mol % or more of $SiO_2$ is contained therein, the temperature required for its melting is high and a difficulty is caused in its preparation.

In Patent Document 2, a $SiO_2$—$Al_2O_3$—SrO crystallized glass containing no $B_2O_3$ is described; however, since 68 mol % or more of $SiO_2$ and 18 mol % or more $Al_2O_3$ are contained therein, the temperature required for its melting is high and a difficulty is caused in its preparation.

In Patent Document 3, a glass containing 0 to 5 wt % $B_2O_3$ is described; however, since 11 mol % or more of CaO is contained therein, its devitrification temperature is high, the content of phosphorus present as an impurity in limestone used as the raw material of CaO is high, and a leak current is likely to be generated in transistors that are prepared on a glass substrate.

In Patent Document 4, a glass containing 0 to 3 wt % $B_2O_3$ is described; however, since 8 mol % or more of SrO and CaO are respectively contained therein, its average thermal expansion coefficient at 50 to 300° C. exceeds $40 \times 10^{-7}$/° C.

In Patent Document 5, a glass containing 0 to 5 mol % $B_2O_3$ is described; however, since 15 mol % or more of SrO is contained, its average thermal expansion coefficient at 50 to 300° C. exceeds $50 \times 10^{-7}$/° C.

In Patent Document 6, a glass containing 0 to 5 wt % $B_2O_3$ is described; however, since 12 mol % or more of BaO is contained therein, its thermal expansion is large and the density is high.

In Patent Document 7, glasses containing 0 to 8 wt % $B_2O_3$ are described and classified as "a glass containing 55 to 67 wt % $SiO_2$ and 6 to 14 wt % $Al_2O_3$" (group a) and "a glass containing 49 to 58 wt % $SiO_2$ and 16 to 23 wt % $Al_2O_3$" (group b). However, in group a, since the content of $SiO_2$ is high, silica sand used as the raw material of $SiO_2$ cannot be completely melted but remains as undissolved silica sand. In group b, since the content of $Al_2O_3$ is high, the devitrification temperature is markedly high.

In order to solve the problems with the glasses described in Patent Documents 1 to 7, an alkali-free glass described in Patent Document 8 is proposed. The alkali-free glass described in Patent Document 8 has a high strain point and can be molded by the float process, so that it is said that this glass is suitable for substrates for displays and substrates for photomasks.

However, as a method for producing high-quality p-Si TFT, although there is the solid-phase crystallization method, it is required that its strain point be higher to apply this method.

In addition, due to the request in glass preparation processes, especially melting and molding, it is in demand that the viscosity of the glass be lower and that the devitrification be low.

BACKGROUND ART DOCUMENTS

Patent Document

Patent Document 1: JP-A-62-113735
Patent Document 2: JP-A-62-100450
Patent Document 3: JP-A-63-176332
Patent Document 4: JP-A-4-325435
Patent Document 5: JP-A-5-232458
Patent Document 6: U.S. Pat. No. 5,326,730, specification
Patent Document 7: JP-A-8-109037
Patent Document 8: JP-A-10-45422

SUMMARY OF THE INVENTION

Problems That the Invention is to Solve

An object of the present invention is to solve the aforementioned problems and to provide an alkali-free glass that has a high strain point, low viscosity, and low devitrification, and is easily subjected to float molding and fusion molding.

Means for Solving the Problems

The present invention provides an alkali-free glass having a strain point of 725° C. or higher; an average thermal expansion coefficient at 50 to 300° C. of $30\times10^{-7}$ to $40\times10^{-7}/°$ C.; a temperature $T_2$ at which a glass viscosity becomes $10^2$ dPa·s of 1,710° C. or lower; a temperature $T_4$ at which a glass viscosity becomes $10^4$ dPa·s of 1,330° C. or lower; a glass surface devitrification temperature ($T_c$) of 1,330° C. or lower; a glass internal devitrification temperature ($T_d$) of 1,330° C. or lower, and comprising, in terms of mol % on the basis of oxides, $SiO_2$: 66 to 70,
$Al_2O_3$: 12 to 15,
$B_2O_3$: 0 to 1.5,
MgO: 6 to 9.5,
CaO: 4.5 to 8,
SrO: 2 to 7,
BaO: 0 to less than 1, and
$ZrO_2$: 0 to 2, provided that MgO+CaO+SrO+BaO is 14 to 18.2, MgO/(MgO+CaO+SrO+BaO) is 0.35 or greater, MgO/(MgO+CaO) is 0.52 or greater, and MgO/(MgO+SrO) is 0.45 or greater, wherein the alkali-free glass does not substantially contain alkali metal oxides.

Also, the present invention provides an alkali-free glass having a strain point of higher than 730° C.; an average thermal expansion coefficient at 50 to 300° C. of $30\times10^{-7}$ to $40\times10^{-7}/°$ C.; a temperature $T_2$ at which a glass viscosity becomes $10^2$ dPa·s of less than 1,710° C.; a temperature $T_4$ at which a glass viscosity becomes $10^4$ dPa·s of less than 1,320° C.; a devitrification temperature (a glass internal devitrification temperature ($T_d$)) of less than 1,300° C. or lower; and comprising essentially, in terms of mol % on the basis of oxides, $SiO_2$: 66 to 70,
$Al_2O_3$: 12 to 14,
$B_2O_3$: 0 to 1.5,
MgO: 6 to 9.5,
CaO: 4.5 to 6,
SrO: 4 to 7,
BaO: 0 to less than 1, and
$ZrO_2$: 0 to 2, provided that MgO+CaO+SrO+BaO is 14 to 18.2, MgO/(MgO+CaO+SrO+BaO) is 0.35 or greater, MgO/(MgO+CaO) is 0.52 or greater, and MgO/(MgO+SrO) is 0.45 or greater, wherein the alkali-free glass does not substantially contain alkali metal oxides.

Advantage of the Invention

The alkali-free glass of the present invention is suitable for substrates for displays, substrates for photomasks, etc., especially for usages with a high strain point, and is easily subjected to float molding or fusion molding.

MODE FOR CARRYING OUT THE INVENTION

Next, the composition ranges of each component will be explained. If $SiO_2$ is present at less than 66% (mol % hereinafter, the same unless specified otherwise), the strain point is not sufficiently raised, the thermal expansion coefficient is increased, and the density is raised. If its amount is more than 70%, the solubility is lowered, and the devitrification temperature (glass surface devitrification temperature ($T_c$), glass internal devitrification temperature ($T_d$)) is raised. Its amount is preferably 67 to 70%.

$Al_2O_3$ suppresses the phase splitting property of the glass, lowers the thermal expansion coefficient, and raises the strain point. However, if its amount is less than 12%, these effects do not appear. In addition, since other components for raising the expansion are increased, the thermal expansion is increased. If its amount is more than 15%, there is a concern that the solubility of the glass will deteriorate or the devitrification temperature (glass surface devitrification temperature ($T_c$), glass internal devitrification temperature ($T_d$)) will be raised. Its amount is preferably 14.5% or less, more preferably 14% or less, and most preferably 12.2 to 13.8%.

Incidentally, the amount of 12 to 13.5% is preferable for $T_4-T_d \geq 80°$ C., which will be mentioned later.

In addition, the amount of 13 to 15% is preferable for the strain point $\geq 735°$ C.

Since $B_2O_3$ improves the melting reactivity of the glass and lowers the devitrification temperature (glass surface devitrification temperature ($T_c$), glass internal devitrification temperature ($T_d$)), it can be added to up to 1.5%. However, if its amount is too large, the strain point is lowered. Therefore, its amount is preferably 1% or less. In addition, it is preferable for it to not be contained in consideration of the environmental burden.

Incidentally, the amount of 0.7 to 1.5% is preferable for $T_4-T_d \geq 80°$ C., which will be mentioned later.

In addition, the amount of less than 0.7% is preferable for the strain point $\geq 735°$ C.

MgO does not raise expansion in alkaline earth metals, does not excessively lower the strain point, and improves the solubility, but if its amount is less than 6%, these effects cannot be sufficiently exerted. On the other hand, if its amount exceeds 9.5%, the devitrification temperature (glass surface devitrification temperature ($T_c$), glass internal devitrification temperature ($T_d$)) is likely to rise. Its amount is 9% or less, preferably 8.5% or less, and more preferably 8% or less.

CaO does not raise expansion, next to Mg among alkaline earth metals, does not excessively lower the strain point, and improves the solubility, but if its amount is less than 4.5%, these effects cannot be sufficiently exerted. On the other hand, if its amount exceeds 8%, there is a concern that the devitrification temperature (glass surface devitrification temperature ($T_c$), glass internal devitrification temperature ($T_d$)) will rise and a large amount of phosphorus present as an impurity in limestone ($CaCO_3$) used as the raw material of CaO will be contained. Its amount is preferably 7% or less, more preferably 6% or less, and further preferably 5% or less.

Incidentally, the amount of 4.5 to 6% is preferable for $T_4-T_d \geq 80°$ C., which will be mentioned later.

In addition, the amount of 5 to 8% is preferable for the strain point $\geq 735°$ C.

SrO does not raise the devitrification temperature of the glass but improves the solubility, but if its amount is less than 2%, these effects cannot be sufficiently exerted. Its amount is preferably 4% or more, more preferably 4.5% or more. On the other hand, if its amount exceeds 7%, there is a concern that the expansion coefficient increases. Its amount is preferable 6% or less, more preferably 5% or less.

Incidentally, the amount of 4 to 7% is preferable for $T_4-T_d \geq 80°$ C., which will be mentioned later.

In addition, the amount of 2 to 6% is preferable for the strain point $\geq 735°$ C.

BaO can be contained to improve the solubility, although it is not essential. However, if its amount is too large, the expansion and density of the glass is excessively raised. Therefore, its amount is less than 1%. It is preferable for it not to be substantially contained.

Since $ZrO_2$ lowers the glass melting temperature or accelerates the crystal precipitation during sintering, it may be contained at up to 2%. If its amount exceeds 2%, the glass becomes unstable, or the relative dielectric constant $\in$ of the glass is increased. Its amount is preferably 1.5% or less.

Incidentally, the amount of 0.5% or less is preferable for $T_4-T_d \geq 80°$ C., which will be mentioned later.

In addition, it is preferable for it to not be substantially contained for the strain point $\geq 735°$ C.

If the content of MgO, CaO, SrO, and BaO is lower than 14%, the solubility is deficient, and if the content is larger than 18.2%, there is a concern that the thermal expansion coefficient will not be small, causing a problem. Preferably, BaO is not substantially contained, and the content thereof is 15 to 18.2%.

If the following three conditions are met, the strain point is raised, and the viscosity of the glass can be raised, without raising the devitrification temperature (glass surface devitrification temperature ($T_c$), glass internal devitrification temperature ($T_d$)):

MgO/(MgO+CaO+SrO+BaO) is 0.35 or greater, preferably 0.37 or greater.

MgO/(MgO+CaO) is 0.52 or greater, preferably 0.55 or greater.

MgO/(MgO+SrO) is 0.45 or greater, preferably 0.5 or greater.

Incidentally, in the glass of the present invention, in order to not degrade the characteristics of a metal or oxide thin film that is provided on the glass surface when a panel is manufactured, an alkali metal oxide is not contained beyond an impurity level (that is, substantially). In addition, for a similar reason, it is preferable that the glass does not substantially contain $P_2O_5$. Moreover, it is preferable that the glass does not substantially contain PbO, $As_2O_3$, and $Sb_2O_3$ to facilitate the recycling of the glass.

In the alkali-free glass of the present invention, ZnO, $Fe_2O_3$, $SO_3$, F, Cl, and $SnO_2$ can be added at 5% or less, as a total amount, to improve the solubility, clarity, and moldability (float moldability, fusion formability) of the glass in addition to the aforementioned components.

The alkali-free glass of the present invention has a strain point of 725° C. or higher, preferably higher than 730° C., and can suppress thermal contraction when a panel is manufactured. In addition, the solid-phase crystallization method can be employed as a method for preparing p-Si TFT.

In the glass of the present invention, the strain point is more preferably 735° C. or higher. If the strain point is 735° C. or higher, this glass is suitable for usages requiring a high strain point (for example, substrates for displays or substrate for illumination in organic EL, or substrates for displays or substrates for illumination in thin plates with a thickness of 100 μm or smaller).

In the molding of a sheet glass having a thickness of 100 μm or smaller, since there is a tendency for the drawing rate during molding to be raised, the virtual temperature of the glass is raised, and the compaction of the glass is apt to be increased. In this case, if a glass having a high strain point is adopted, the compaction can be suppressed.

In addition, in the alkali-free glass of the present invention, the glass transition point is preferably 760° C. or higher, more preferably 770° C. or higher, and further preferably 780° C. or higher.

Moreover, in the alkali-free glass of the present invention, the average thermal expansion coefficient at 50 to 300° C. is $30 \times 10^{-7}$ to $40 \times 10^{-7}/°$ C., so that the heat impact resistance is high and the productivity during panel manufacture can be raised. In the alkali-free glass of the present invention, the average thermal expansion coefficient at 50 to 300° C. is preferably $35 \times 10^{-7}$ to $40 \times 10^{-7}/°$ C., Furthermore, in the alkali-free glass of the present invention, the specific gravity thereof is preferably 2.65 or smaller, more preferably 2.64 or smaller, and further preferably 2.62 or smaller.

In addition, in the alkali-free glass of the present invention, the temperature $T_2$ at which the viscosity $\eta$ becomes $10^2$ poise (dPa·s) is 1,710° C. or lower, preferably lower than 1,710° C., more preferably 1,700° C. or lower, and further preferably 1,690° C. or lower, so that its melting is relatively easy to reach.

Moreover, in the glass of the present invention, the temperature $T_4$ at which the viscosity $\eta$ is $10^4$ poise becomes 1,330° C. or lower, preferably lower than 1,320° C., more preferably lower than 1,320° C., even more preferably 1,315° C. or lower, and further preferably 1,310° C. or lower, which is suitable for float molding and fusion molding.

Furthermore, in the glass of the present invention, the devitrification temperature (glass internal devitrification temperature ($T_d$)) is 1,330° C. or lower, preferably lower than 1,300° C., and more preferably 1,290° C. or lower, so that molding using the float process or fusion process is easy.

In addition, $T_4$ is preferably the devitrification temperature (glass internal devitrification temperature ($T_d$)) or higher.

Moreover, in the glass of the present invention, the glass surface devitrification temperature ($T_c$) thereof is 1,330° C. or lower, more preferably 1,300° C. or lower, and further preferably 1,260° C. or lower.

The glass surface devitrification temperature ($T_c$) is the average value of the highest temperature at which crystals are precipitated on the surface of the glass and the lowest temperature at which no crystal is precipitated, which is attained through optical microscope observation after pulverized glass particles are put into a plate made of platinum and heat-treated for 17 h in an electric furnace controlled to a fixed temperature.

Furthermore, in the glass of the present invention, the glass internal devitrification temperature ($T_d$)) thereof is preferably 1,330° C. or lower, more preferably 1,300° C. or lower, even more preferably 1,260° C. or lower, further preferably 1,250° C. or lower, and especially preferably 1,220° C. or lower.

The glass internal devitrification temperature ($T_d$) is the average value of the highest temperature at which crystals are precipitated in the glass, specifically in a part deeper than 100 μM from the glass surface, and the lowest temperature at which no crystal is precipitated, which is attained through optical microscope observation after pulverized glass particles are put into a plate made of platinum and heat-treated for 17 h in an electric furnace controlled to a fixed temperature.

In consideration of the devitrification prevention during molding of a sheet glass, it is desirable for the float process results to satisfy the expression $T_4-T_c \geq -20°$ C., preferably $T_4-T_c \geq 0°$ C., and more preferably $T_4-T_c \geq 20°$ C. In addition, it is desirable for the fusion process results to satisfy the expression $T_4-T_d \geq 80°$ C., preferably $T_4-T_d \geq 90°$ C.

Moreover, in the glass of the present invention, the Young's modulus thereof is 84 GPa or higher, preferably 86 GPa or higher, more preferably 88 GPa or higher, and further preferably 90 GPa or higher.

Incidentally, for a composition in which $T_4-T_d \geqq 80°$ C., the Young's modulus is preferably 84 GPa or higher.

In addition, for a composition whose strain point is 735° C. or higher, the Young's modulus is preferably 88 GPa or higher.

The glass of the present invention, for example, can be prepared by the following method. Ordinary raw materials of each component are mixed so that the desired components are obtained, with this mixture being continuously charged into a melting furnace and melted by heating to 1,500 to 1,800° C. This melted glass is molded to a prescribed plate thickness by the float process or fusion process, gradually cooled, and cut, so that a sheet glass can be obtained.

Since the glass of the present invention has relatively low solubility, the following are preferably used as the raw materials of each component.

(Silicon Source)

As a silicon source of $SiO_2$, silica sand can be used. If silica sand having the median particle diameter $D_{50}$ of 20 to 27 μm, the ratio of particles having a particle diameter of 2 μm or smaller of 0.3 vol % or less and the ratio of particles having a particle diameter of 100 μm or greater of 2.5 vol % or less is used, since the silica sand can be melted while suppressing the cohesion of the silica sand, melting of the silica sand is easy, thus being able to obtain an alkali-free glass with little foam as well as high homogeneity and flatness.

Here, "particle diameter" in this specification means the diameter corresponding to a sphere of the silica sand (meaning the primary particle diameter in the present invention); specifically, the particle diameter in the particle size distribution of a powder measured by the laser diffraction/scattering method.

In addition, "median particle diameter $D_{50}$" in this specification means the particle diameter in which the amount of particles greater than a certain particle diameter in the particle size distribution of a powder measured by the laser diffraction method is 50% of the entire powder. In other words, it means the particle diameter at a cumulative frequency of 50% in the particle size distribution of a powder measured by the laser diffraction method.

Moreover, "ratio of particles having a particle diameter of 2 μm or smaller" and "ratio of particles having a particle diameter of 100 μm or greater," for example, are determined by measuring the particle size distribution according to the laser diffraction/scattering method.

The median particle diameter $D_{50}$ of the silica sand is more preferably 25 μm or smaller because the silica sand will be more easily melted.

In addition, the ratio of particles having a particle diameter of 100 μm or greater in the silica sand is especially preferably 0% because melting of the silica sand is easier.

(Alkaline-Earth Metal Source)

As the alkaline-earth metal source, an alkaline-earth metal compound can be used. Here, as detailed examples of the alkaline-earth metal compound, carbonates such as $MgCO_3$, $CaCO_3$, $BaCO_3$, $SrCO_3$, and $(Mg, Ca)CO_3$ (dolomite), oxides such as MgO, CaO, BaO, and SrO, and hydroxides such as $Mg(OH)_2$, $Ca(OH)_2$, $Ba(OH)_2$, and $Sr(OH)_2$ can be mentioned. A hydroxide of alkaline-earth metals is preferably contained in part or the whole of the alkaline-earth metal source because the amount of undissolved $SiO_2$ component is decreased when the glass raw materials are melted. When foam is generated in the glass melt, this undissolved $SiO_2$ is introduced into the foam and said $SiO_2$ accumulates near the surface layer of the glass melt. Therefore, a difference is generated in the composition ratio of $SiO_2$ between the surface of the glass melt and parts other than the surface layer, lowering the homogeneity of the glass and lowering the flatness.

The hydroxide content of the alkaline-earth metal is preferably 15 to 100 mol % (calculated on the basis of MO), more preferably 30 to 100 mol % (calculated on the basis of MO), and further preferably 60 to 100 mol % (calculated on the basis of MO) with respect to 100 mol % of the alkaline-earth metal source (calculated on the basis of MO, with M representing an alkaline-earth metal element) because the amount of undissolved $SiO_2$ component is decreased when the glass raw materials are melted.

With the increase in the mole ratio of the hydroxide in the alkaline-earth metal source, since the amount of undissolved $SiO_2$ component is decreased when the glass raw materials are melted, a higher mole ratio of the aforementioned hydroxide is preferable.

As the alkaline-earth metal source, specifically the mixture of a hydroxide of alkaline-earth metals and a carbonate, a single hydroxide of alkaline-earth metals, etc., can be used. As the carbonate, one or more of $MgCO_3$, $CaCO_3$, and $(Mg, Ca)(CO_3)_2$ (dolomite) is/are preferably used. In addition, as the hydroxide of the alkaline-earth metals, at least one of $Mg(OH)_2$ and $Ca(OH)_2$ is preferably used, and $Mg(OH)_2$ is more preferably used.

(Boron Source)

In case the alkali-free glass includes $B_2O_3$, boron compounds can be used as the boron source of $B_2O_3$. Here, as detailed examples of the boron compounds, orthoboric acid ($H_3BO_3$), metaboric acid ($HBO_2$), tetraboric acid ($H_2B_4O_7$), boric anhydride ($B_2O_3$), etc., can be mentioned. In the preparation of an ordinary alkali-free glass, orthoboric acid is used in terms of the low cost and ease of obtaining it.

In the present invention, as the boron source, boric anhydride is preferably contained at 10 to 100 mass % (calculated on the basis of $B_2O_3$) with respect to 100 mass % of the boron source (calculated on the basis of $B_2O_3$). If the boric anhydride is contained in an amount of 10 mass % or more, the cohesion of the glass raw materials is suppressed, thereby obtaining the improvement effect of foam reduction, homogeneity, and flatness. The boric anhydride is more preferably contained in an amount of 20 to 100 mass %, further preferably 40 to 100 mass %.

As a boron compound other than the boric anhydride, orthoboric acid is preferable in terms of the low cost and ease of obtaining it.

EXAMPLES

In the following, Examples 1 to 5 and 11 to 16 are working examples; Examples 6 and 7 are comparative examples. Raw materials of each component were mixed so that the desired composition was obtained, and this mixture was melted at a temperature of 1,500 to 1,600° C. in a platinum crucible. In the melting, the glass was homogenized by stirring using a platinum stirrer. Next, the melted glass was poured out, molded into a plate shape, and gradually cooled.

Table 1 shows the glass composition (units: mol %), thermal expansion coefficient at 50 to 300° C. (units: $\times 10^{-2}$/° C.), strain point (units: ° C.), glass transition point (units: ° C.), specific gravity, Young's modulus (GPa) (measured by the ultrasonic method), temperature $T_2$ (log η=2, that is, the temperature at which the viscosity is $10^2$ poise, units: ° C.) as an index of solubility, and temperature $T_4$ (log η=4, that is, the temperature at which the viscosity is $10^4$ poise, units: ° C.) as an index of the float moldability and fusion moldability, as high-temperature viscosity values, and devitrification temperature (glass surface devitrification temperature ($T_c$), glass internal devitrification temperature ($T_d$)) (units: ° C.).

Incidentally, in Table 1, the values shown with parentheses are calculated values.

point (for example, substrates for display or substrates for illumination for organic EL, or substrates for displays or substrates for the illumination of thin plates with a thickness of 100 μm or smaller).

TABLE 1

| Mol % | Example 1 | Example 2 | Example 3 | Example 4 | Example 5 | Example 6 | Example 7 |
|---|---|---|---|---|---|---|---|
| $SiO_2$ | 68.4 | 69.4 | 68.4 | 68.4 | 68.4 | 71.9 | 65.9 |
| $Al_2O_3$ | 12.5 | 12.5 | 13.5 | 12.5 | 13.0 | 12.5 | 12.5 |
| $B_2O_3$ | 1.0 | 1.0 | 1.0 | 1.0 | 0.0 | 0.0 | 1.5 |
| MgO | 6.7 | 7.7 | 7.7 | 6.2 | 7.7 | 5.2 | 6.7 |
| CaO | 5.2 | 5.2 | 5.2 | 5.2 | 5.2 | 5.2 | 6.7 |
| SrO | 5.2 | 4.2 | 4.2 | 6.2 | 5.2 | 5.2 | 6.7 |
| BaO | 0.0 | 0.0 | 0.0 | 0.0 | 0.0 | 0.0 | 0.0 |
| $ZrO_2$ | 1.0 | 0.0 | 0.0 | 0.5 | 0.5 | 0.0 | 0.0 |
| MgO + CaO + SrO + BaO | 17.1 | 17.1 | 17.1 | 17.6 | 18.1 | 15.6 | 20.1 |
| MgO/(MgO + CaO + SrO + BaO) | 0.39 | 0.45 | 0.45 | 0.35 | 0.43 | 0.33 | 0.33 |
| MgO/(MgO + CaO) | 0.56 | 0.60 | 0.60 | 0.54 | 0.60 | 0.50 | 0.50 |
| MgO/(MgO + SrO) | 0.56 | 0.65 | 0.65 | 0.50 | 0.60 | 0.50 | 0.50 |
| Average thermal expansion coefficient [×$10^{-7}$/° C.] | 38.9 | 36.2 | 38.8 | 39.9 | 37.4 | 33.0 | 40.0 |
| Strain point [° C.] | (738) | (735) | (741)731 | (736) | (741)734 | 750 | 720 |
| Glass transition point[° C.] | 788 | 785 | 791 | 786 | 791 | (800) | (770) |
| Specific gravity | (2.6) | (2.55) | 2.56 | (2.61) | 2.59 | 2.54 | 2.65 |
| Young's modulus [GPa] | (90) | (88) | 89.4 | (90) | 89.4 | (87) | (85) |
| $T_2$[° C.] | 1680 | 1708 | 1696 | 1673 | 1690 | 1770 | 1680 |
| $T_4$[° C.] | 1309 | 1319 | 1312 | 1316 | 1305 | 1370 | 1330 |
| $T_c$[° C.] | 1320≧ | 1280 | 1238 | 1330≧ | 1285 | (1330) | 1330≧ |
| $T_d$[° C.] | 1319 to 1329 Average: 1324 | 1284> (1239≧) | 1277> Measured value: 1218 | 1278> | 1280 to 1290 Average: 1285 | 1330 | 1310 |
| $T_4 - T_c$[° C.] | −11≦ | 39 | 74 | 14≦ | 20 | (40) | 0≦ |
| $T_4 - T_d$[° C.] | −15 | (80≦) | 94 | 30< | 20 | 40 | 20 |

TABLE 2

| Mol % | Example 11 | Example 12 | Example 13 | Example 14 | Example 15 | Example 16 |
|---|---|---|---|---|---|---|
| $SiO_2$ | 68.7 | 68.4 | 68.7 | 68.7 | 68.4 | 67 |
| $Al_2O_3$ | 14.0 | 14.0 | 14.0 | 14.0 | 13.5 | 14.5 |
| $B_2O_3$ | 0.0 | 0.0 | 0.5 | 0.0 | 0.0 | 0.5 |
| MgO | 7.3 | 8.2 | 7.1 | 8.0 | 7.6 | 8.0 |
| CaO | 6.7 | 5.2 | 6.5 | 5.7 | 7.1 | 7.5 |
| SrO | 3.3 | 4.2 | 3.2 | 3.6 | 3.4 | 2.5 |
| BaO | 0.0 | 0.0 | 0.0 | 0.0 | 0.0 | 0.0 |
| $ZrO_2$ | 0.0 | 0.0 | 0.0 | 0.0 | 0.0 | 0.0 |
| MgO + CaO + SrO + BaO | 17.3 | 17.6 | 16.8 | 17.3 | 18.1 | 18 |
| MgO/(MgO + CaO + SrO + BaO) | 0.42 | 0.47 | 0.42 | 0.46 | 0.42 | 0.44 |
| MgO/(MgO + CaO) | 0.52 | 0.61 | 0.52 | 0.58 | 0.52 | 0.52 |
| MgO/(MgO + SrO) | 0.69 | 0.66 | 0.69 | 0.69 | 0.69 | 0.76 |
| Average thermal expansion coefficient [×$10^{-7}$/° C.] | 36.7 | 37.8 | 36.4 | 36.2 | 38.1 | (38) |
| Strain point [° C.] | 743 | 740 | 737 | 742 | 744 | (740) |
| Glass transition point[° C.] | 797 | 794 | 796 | 797 | 796 | (790) |
| Specific gravity | 2.56 | 2.58 | 2.56 | 2.57 | 2.57 | (2.56) |
| Young's modulus [GPa] | 90.8 | 91.2 | 90.8 | (91) | 90.9 | (91) |
| $T_2$[° C.] | 1708 | 1703 | 1705 | 1702 | 1698 | (1675) |
| $T_4$[° C.] | 1325 | 1320 | 1327 | 1325 | 1321 | (1285) |
| $T_c$[° C.] | 1308 | 1313 | 1285 | 1298 | 1295 | 1300≧ |
| $T_d$[° C.] | 1293 | 1298 | 1273 | 1282 | 1275 | 1300≧ |
| $T_4 - T_c$[° C.] | 17 | 7 | 42 | 27 | 26 | 15≦ |
| $T_4 - T_d$[° C.] | 32 | 22 | 54 | 43 | 46 | 15≦ |

As seen from the table, in all of the glasses of the working examples, it is understood that the thermal expansion coefficient thereof is as low as 30×$10^{-7}$ to 40×$10^{-7}$/° C., the strain point thereof is as high as 725° C. or higher, and the heat treatment at high temperatures can be sufficiently withstood.

Incidentally, Examples 11 to 16 show a strain point of 735° C. or higher and are suitable for usages involving a high strain The temperature $T_2$ as an index of solubility is as relatively low as 1,710° C. or lower, and melting is easy. The temperature $T_4$ as an index of moldability is 1,330° C. or lower, and the devitrification temperature (glass internal devitrification temperature ($T_d$)) is 1,330° C. or lower, preferably lower than 1,300° C. It is observed that there are no problems such as the occurrence of devitrification during the molding (float molding, fusion molding).

Incidentally, Examples 2 and 3 show $T_4-T_d \geq 80°$ C. and are suitable for molding using the fusion process.

In Example 6, since $SiO_2$ is contained in an amount of more than 70 mol %, MgO is contained in an amount of less than 6 mol %, MgO/(MgO+CaO+SrO+BaO) is smaller than 0.35, and MgO/(MgO+CaO) is smaller than 0.52, the temperature $T_2$ as an index of solubility is as high or higher than 1,710° C., it shows inferior solubility. In addition, since the temperature $T_4$ as an index of float moldability using the fusion process is as high or higher than 1,330° C., the float molding or fusion molding is difficult.

In Example 7, since MgO/(MgO+CaO+SrO+BaO) is smaller than 0.35 and MgO/(MgO+CaO) is smaller than 0.52, the strain point is as low or lower than 725° C.

For the glass with the composition of Example 5, the solubility of the glass was evaluated while changing the silicon source of $SiO_2$ and the alkaline-earth metal source as follows.

Example 8

As the silicon source of $SiO_2$, silica sand having the median particle diameter $D_{50}$ of 50 μm and both the ratio of particles having a particle diameter of 2 μm or smaller and the ratio of particles having a particle diameter of 100 μm or greater of 0 vol % was used. As the alkaline-earth metal source, dolomite ((Mg, Ca) $(CO_3)_2$) was used.

Example 9

As the silicon source of $SiO_2$, silica sand having the median particle diameter $D_{50}$ of 25 μm, the ratio of particles having a particle diameter of 2 μm or smaller of 0 vol %, and the ratio of particles having a particle diameter of 100 μm or greater of 2.2 vol % was used. As the alkaline-earth metal source, dolomite ((Mg, Ca) $(CO_3)_2$) was used.

Example 10

As the silicon source of $SiO_2$, silica sand having the median particle diameter $D_{50}$ of 25 μm, the ratio of particles having a particle diameter of 2 μm or smaller of 0 vol %, and the ratio of particles having a particle diameter of 100 μm or greater of 2.2 vol % was used. As the alkaline-earth metal source, $Mg(OH)_2$+Ca $(CO_3)_2$ was used. Incidentally, the content of $Mg(OH)_2$ in the alkaline-earth metal source is 43 mol % (calculated on the basis of the oxide).

For the glasses of Examples 8 to 10, the solubility of the glasses was evaluated in the following sequence.

250 g of raw material were added to a platinum boat of 400 mm in length×20 mm in width and heated for 1 hour in a furnace with a temperature gradient of 800 to 1,500° C. The temperature at which half or more of the raw material was vitrified as seen by the naked eye was adopted as the melting-start temperature. In addition, the highest temperature at which residual undissolved substances could be confirmed through observation with a microscope was adopted as the undissolved substance upper-limit temperature.

The results are shown in the following table.

TABLE 3

| | Melting-start temperature (° C.) | Undissolved substance upper-limit temperature (° C.) |
|---|---|---|
| Example 8 | 1362 | >1500 |
| Example 9 | 1319 | 1490 |
| Example 10 | 1300 | 1480 |

In Examples 9 and 10 in which silica sand having the median particle diameter $D_{50}$ of 25 μm, the ratio of particles having a particle diameter of 2 μm or smaller of 0 vol % and the ratio of particles having a particle diameter of 100 μm or greater of 2.2 vol %, was used as the silicon source of $SiO_2$, the improvement of the solubility was confirmed, compared with Example 8. In Example 10 in which $Mg(OH)_2$+Ca $(CO_3)_2$ was used as the alkaline-earth metal source, the solubility was especially improved.

The present invention has been explained with reference to detailed or specific embodiments; however, it is evident to the party concerned that the present invention can be variously changed or modified without departing from the spirit and scope of the present invention.

This application is based on Japanese Patent Application No. 2009-157542 filed on Jul. 2, 2009 and Japanese Patent Application No. 2010-127767 filed on Jun. 3, 2010, and the entire contents of which are incorporated herein by reference.

INDUSTRIAL APPLICABILITY

The alkali-free glass of the present invention has a high strain point, can be molded by the float process or fusion process, and is suitable for substrates for displays and substrates for photomasks. In addition, the alkali-free glass of the present invention is also suitable for substrates for solar cells.

The invention claimed is:

1. An alkali-free glass, comprising, in terms of mol % on the basis of oxides:
   $SiO_2$: 66 to 70;
   $Al_2O_3$: 12 to 13.5;
   $B_2O_3$: 0.7 to 1.5;
   MgO: 6 to 9.5;
   CaO: 4.5 to 6;
   SrO: 4 to 7;
   BaO: 0 to less than 1; and
   $ZrO_2$: 0 to 0.5,
provided that:
   MgO+CaO+SrO+BaO is 14 to 18.2;
   MgO/(MgO+CaO+SrO+BaO) is 0.35 or greater;
   MgO/(MgO+CaO) is 0.52 or greater; and
   MgO/(MgO+SrO) is 0.45 or greater,
wherein the alkali-free glass does not substantially contain alkali metal oxides, and has the following characteristics:
   a strain point of 725° C. or higher;
   an average thermal expansion coefficient at 50 to 300° C. of $30 \times 10^{-7}$ to $40 \times 10^{-7}$/° C.;
   a temperature $T_2$ at which a glass viscosity becomes $10^2$ dPa·s of 1,710° C. or lower;
   a temperature $T_4$ at which a glass viscosity becomes $10^4$ dPa·s of 1,315° C. or lower;
   a Young's modulus of 84 GPa or higher;
   a glass surface devitrification temperature ($T_c$) of 1,330° C. or lower; and
   a glass internal devitrification temperature ($T_d$) of 1,250° C. or lower,
such that $T_4-T_d$ is equal to or greater than 80° C.

2. A method for producing a sheet glass, the method comprising molding the alkali-free glass according to claim 1 by fusion process, to obtain a sheet glass.

3. A method for producing the alkali-free glass according to claim 1, wherein ordinary raw materials of each component are mixed so that the desired components are obtained, with this mixture being continuously charged into a melting furnace and melted by heating to 1,500 to 1,800° C., wherein raw material of a silicon source of the $SiO_2$ is a silica sand having a median particle diameter $D_{50}$ of 20 to 27 μm, such that a ratio of particles having a particle diameter of 2 μm or smaller is 0.3 vol % or less and a ratio of particles having a particle diameter of 100 μm or greater is 2.5 vol % or less.

4. A method for producing the alkali-free glass according to claim 1, wherein ordinary raw materials of each component are mixed so that the desired components are obtained, with this mixture being continuously charged into a melting furnace and melted by heating to 1,500 to 1,800° C., wherein raw material of an alkaline-earth metal source of MgO, CaO, SrO, and BaO is alkaline-earth metal source comprising hydroxides of alkaline-earth metals at 15 to 100 mol % (calculated on the basis of MO, with M representing an alkaline-earth metal element; hereinafter the same) with respect to 100 mol % (calculated on the basis of MO) of the alkaline-earth metal source.

5. A method for producing the alkali-free glass according to claim 1, wherein ordinary raw materials of each component are mixed so that the desired components are obtained, with this mixture being continuously charged into a melting furnace and melted by heating to 1,500 to 1,800° C., wherein raw material of:
a silicon source of the $SiO_2$ is a silica sand having a median particle diameter $D_{50}$ of 20 to 27 μm, such that a ratio of particles having a particle diameter of 2 μm or smaller of 0.3 vol % or less and a ratio of particles having a particle diameter of 100 μm or greater of 2.5 vol % or less; and
an alkaline-earth metal source of MgO, CaO, SrO, and BaO is an alkaline-earth metal source comprising hydroxides of alkaline-earth metals at 15 to 100 mol % (calculated on the basis of MO, with M representing an alkaline-earth metal element; hereinafter the same) with respect to 100 mol % (calculated on the basis of MO) of the alkaline-earth metal source.

6. An alkali-free glass, comprising, in terms of mol % on the basis of oxides:
$SiO_2$: 66 to 70;
$Al_2O_3$: 13 to 15;
$B_2O_3$: 0 to less than 0.7;
MgO: 6 to 9.5;
CaO: 5 to 8;
SrO: 2 to 6; and
BaO: 0 to less than 1,
provided that:
MgO+CaO+SrO+BaO is 14 to 18.2;
MgO/(MgO+CaO+SrO+BaO) is 0.35 or greater;
MgO/(MgO+CaO) is 0.52 or greater; and
MgO/(MgO+SrO) is 0.45 or greater,
wherein the alkali-free glass does not substantially contain alkali metal oxides, does not substantially contain $ZrO_2$, and has the following characteristics:
a strain point of 735° C. or higher;
an average thermal expansion coefficient at 50 to 300° C. of $30 \times 10^{-7}$ to $40 \times 10^{-7}/°$ C.;
a temperature $T_2$ at which a glass viscosity becomes $10^2$ dPa·s of 1,710° C. or lower;
a temperature $T_4$ at which a glass viscosity becomes $10^4$ dPa·s of 1,330° C. or lower;
a Young's modulus of 88 GPa or higher;
a glass surface devitrification temperature ($T_c$) of 1,300° C. or lower; and
a glass internal devitrification temperature ($T_d$) of 1,330° C. or lower,
such that $T_4-T_c$ is equal to or greater than −20° C.

7. A method for producing a sheet glass, the method comprising molding the alkali-free glass according to claim 6 by float process, to obtain a sheet glass.

8. A method for producing the alkali-free glass according to claim 6, wherein ordinary raw materials of each component are mixed so that the desired components are obtained, with this mixture being continuously charged into a melting furnace and melted by heating to 1,500 to 1,800° C., wherein raw material of a silicon source of the $SiO_2$ is a silica sand having a median particle diameter $D_{50}$ of 20 to 27 μm, such that a ratio of particles having a particle diameter of 2 μm or smaller is 0.3 vol % or less and a ratio of particles having a particle diameter of 100 μm or greater is 2.5 vol % or less.

9. The method for producing the alkali-free glass according to claim 6, wherein ordinary raw materials of each component are mixed so that the desired components are obtained, with this mixture being continuously charged into a melting furnace and melted by heating to 1,500 to 1,800° C., wherein raw material of an alkaline-earth metal source of MgO, CaO, SrO, and BaO is an alkaline-earth metal source comprising hydroxides of alkaline-earth metals at 15 to 100 mol % (calculated on the basis of MO, with M representing an alkaline-earth metal element; hereinafter the same) with respect to 100 mol % (calculated on the basis of MO) of the alkaline-earth metal source.

10. A method for producing the alkali-free glass according to claim 6, wherein ordinary raw materials of each component are mixed so that the desired components are obtained, with this mixture being continuously charged into a melting furnace and melted by heating to 1,500 to 1,800° C., wherein raw material of:
a silicon source of the $SiO_2$ is a silica sand having a median particle diameter $D_{50}$ of 20 to 27 μm, such that a ratio of particles having a particle diameter of 2 μm or smaller of 0.3 vol % or less and a ratio of particles having a particle diameter of 100 μm or greater of 2.5 vol % or less; and
an alkaline-earth metal source of MgO, CaO, SrO, and BaO is an alkaline-earth metal source comprising hydroxides of alkaline-earth metals at 15 to 100 mol % (calculated on the basis of MO, with M representing an alkaline-earth metal element; hereinafter the same) with respect to 100 mol % (calculated on the basis of MO) of the alkaline-earth metal source.

* * * * *